United States Patent Office 3,198,801
Patented Aug. 3, 1965

3,198,801
METHYL 1-AMINOPIPERIDINE-4-CARBOXYLATE
Philip M. Carabateas, Schodack, N.Y., assignor to Sterling Drug Inc., New York, N.Y., a corporation of Delaware
No Drawing. Filed Nov. 9, 1962, Ser. No. 236,705
1 Claim. (Cl. 260—294.3)

This invention relates to new heterocyclic compounds, and in particular, with 1,2-diazabicyclo[2.2.2]octanes, which have a novel ring system, and with methods for preparing the new compounds.

One aspect of my invention resides in the concept of new chemical compounds having as a constituent part the novel 1,2-diazabicyclo[2.2.2]octane ring system, I.

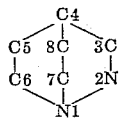

(I)

The new compounds of my invention have the above skeletal formula wherein the substituents attached to the various ring members are selected from organic and inorganic radicals known in the art of organic chemistry. I have found that compounds having this previously unknown heterocyclic structure are useful as pharmaceutical agents and as intermediates for the preparation of a wide variety of compounds having useful pharmacological and chemotherapeutic activities.

For purposes of illustration, certain preferred substituents are exemplified by organic radicals, for example, carbocyclic- and heterocyclic-aryl saturated and unsaturated straight- and branched-chain acyclic and cyclic aliphatic, carboxylic- and sulfonic-acyl, alkoxy, aryloxy, mono- and di-substituted amino, alkylmercapto, and arylmercapto; and by inorganic radicals, for example, as hydroxy amino, mercapto, oxo, thio, halo, nitro, nitroso, oximino, and metallo, and various combinations of the above organic and inorganic substituents.

Another aspect of my invention resides in the concept of methods for preparing the compounds of Formula I. The methods comprehended by my invention consist of intramolecularly cyclizing 1-aminopiperidines substituted in the 4-position by a substituent capable of reacting with the 1-amino group to form either one or two intramolecular bonds, said substituent being attached to the piperidine ring through a carbon atom.

A particularly preferred group of compounds of the class described above has the general Formula II,

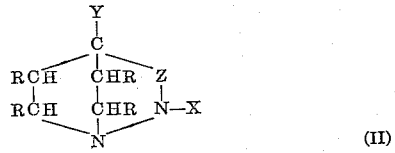

(II)

wherein: R is a member selected from the group consisting of H and lower-alkyl; X is a member selected from the group consisting of H, lower-alkyl, monocyclic-aryl-lower-alkyl, lower-alkenyl, lower-alkanoyl, lower-alkenoyl, monocyclic aroyl, lower-alkanesulfonyl, monocarbocyclic-arenesulfonyl, carbamyl, thiocarbamyl, N-arylthiocarbamyl, N-arylcarbamyl, cyanoalkyl, hydroxyalkyl, aminoalkyl, and di-(lower-alkyl)amino-lower-alkyl; Y is a member selected from the group consisting of H, monocarbocyclic-aryl-lower alkyl, and aromatic radicals of the carbocyclic and heterocyclic series having one to two aromatic rings each having from five to six ring atoms, Z is a member selected from the group consisting of C=O, C=S, C=NH, CH₂ and CHR' where R' is a member of the group consisting of lower-aliphatic, monocarbocyclic aryl-lower-alkyl, and di-(lower-alkyl)amino-lower-alkyl.

In the preferred compounds of Formula II, R is H or lower-alkyl. When representing lower-alkyl, R is a straight-or branched-chain saturated aliphatic radical having from one to seven carbon atoms in the chain. Examples of lower-alkyl radicals represented by R include methyl, ethyl, n-propyl, isopropyl, n-butyl, isobutyl, tert.-butyl, n-amyl, n-hexyl, n-heptyl, and the like.

In the preferred compounds of Formula II, X is H, lower-alkyl, lower-alkenyl, monocarbocyclic-aryl-lower-alkyl, lower-alkanoyl, lower-alkenoyl, monocyclic aroyl, lower - alkanesulfonyl, monocarbocyclic - arenesulfonyl, carbamyl, thiocarbamyl, N-arylcarbamyl, N-arylthiocarbamyl, cyanoalkyl, hydroxyalkyl, aminoalkyl, or di-lower-alkylaminoalkyl. When representing lower-alkenyl, X is a straight- or branched-chain hydrocarbon radical having at least one double-bond and containing from three to seven carbon atoms. Examples of lower-alkenyl radicals represented by X are allyl, methallyl, 1-(2-butenyl), 1-(2,4 pentadienyl), 1-(3-hexenyl) and 1-(3-heptenyl). When representing monocarbocyclic-aryl-lower-alkyl, X is a lower alkyl radical bearing as a substituent a phenyl radical which can be unsubstituted or substituted with from one to three substituents as described below. Examples of monocarbocyclic-aryl-lower-alkyl radicals represented by X are benzyl, phenethyl, p-chlorobenzyl, 3,4,5-trimethoxy-benzyl, 3-nitrobenzyl, and the like. When representing lower-alkanoyl, X is a straight- or branched-chain saturated aliphatic carboxylic acid radical having from one to seven carbon atoms in the chain. Examples of lower-alkanoyl radicals represented by X are formyl, acetyl, propionyl, butyryl, isobutyryl, valeryl, caproyl, isocaproyl, heptanoyl, and the like. When representing lower-alkenyl, X represents a straight- or branched-chain unsaturated aliphatic carboxylic acid radical having from three to seven carbon atoms and having at least one double bond. Examples of lower-alkenoyl radicals represented by X are acrylyl, methacrylyl, 1-(2-butenoyl), 1-(3-hexenoyl), 1-(6-heptenoyl), and 1-(2,4-pentadienoyl). When representing monocyclic-aroyl, X represents a carbocyclic or heterocyclic carboxylic acid radical having from five to six ring members. Examples of monocyclic-aroyl radicals represented by X are benzoyl and benzoyl substituted by from one to three lower-alkyl, lower-alkoxy, nitro, halo, amino, hydroxy and the like substituents, furoyl, 5-nitrofuroyl, picolinoyl, isonicotinoyl, nicotinoyl, and the like. Representative examples of lower-alkanesulfonyl radicals are methanesulfonyl and ethanesulfonyl. Representative examples of monocarbocyclic-arene-sulfonyl are benzenesulfonyl p-toluenesulfonyl and p-chlorobenzenesulfonyl. Representative examples of N-arylcarbamyl are N-phenylcarbamyl and N-(β-naphthyl) carbamyl. Representative examples of N-arylthiocarbamyl are N-phenyl-thiocarbamyl and N-(m-nitrophenyl)thiocarbamyl. Representative examples of cyano-lower-alkyl are cyanomethyl and 2-cyanoethyl. Representative examples of hydroxy-lower-alkyl are 2-hydroxyethyl and 2-hydroxypropyl. Representative examples of amino-lower-alkyl are 2-aminoethyl and 3-aminopropyl. Representative examples of di-(lower-alkyl)amino-lower-alkyl are 2-dimethylaminoethyl, 3-diethylaminopropyl, 4-dimethylaminobutyl, and dimethylaminohexyl.

In the preferred compounds of Formula II, Y is an H, lower-alkyl, lower-alkenyl or monocarbocyclic-aryl-lower-alkyl radical, or an aromatic radical of the carbocyclic or heterocyclic class having one to two aromatic rings each having from five to six ring atoms. When representing monocarbocyclic-aryl-lower-alkyl radicals, Y is defined as above for the same term represented by X. When representing aromatic radicals, Y represents radicals thiazolyl, quinolinyl, indolyl, oxazolyl, thiazinyl, thienyl, having one or two aromatic rings which can be benzenoid or five- or six-membered heteroaromatic, as illustrated by phenyl, naphthyl, biphenylyl, pyridyl, pyrimidyl, furyl, and the like. Particularly preferred aromatic radicals are monocarbocyclic-aromatic radicals having six ring carbon atoms, that is, aromatic radicals of the benzene series. These embodiments, which are particularly preferred primarily because of their commercial practicability due to the availability of intermediates, include compounds wherein the aromatic radical is the unsubstituted phenyl radical and phenyl radicals substituted by low molecular weight substituents, for example, lower-alkyl, lower-alkoxy, lower-alkylmercapto, lower-alkanesulfonyl, halo, lower-alkylamino, di-(lower-alkyl)amino, nitro, amino, lower-carboxylic-acylamino, trifluoromethyl, hydroxy, and the like. The substituted phenyl radicals have preferably from one to three substituents which can be in any of the available positions of the phenyl nucleus, and where more than one substituent is present, they can be the same or different, and they can be in any of the position combinations relative to each other. The lower-alkyl, lower-alkoxy, lower-alkylmercapto, lower-alkanesulfonyl, lower-alkylamino, di-(lower-alkyl)amino, lower-carboxylic-acylamino, and the like substituents have preferably from one to seven carbon atoms which can be arranged as straight- or branched-chains and are illustrated by methyl, ethyl, n-hexyl, n-heptyl, methoxy, isobutoxy, ethylmercapto, n-butylsulfonyl, isopropylamino, acetyl-amino, and the like.

In the preferred compounds of Formula II, Z is C=O, C=S, C=NH, and CHR' where R' is a monocarbocyclic-lower-alkyl, lower aliphatic, or di-(lower alkyl)amino-lower-alkyl radical. Lower-aliphatic radicals are saturated- or unsaturated-acyclic hydrocarbon radicals having from one to about seven carbon atoms. Particularly preferred lower-aliphatic radicals are lower-alkyl and lower-alkenyl radicals having from two to seven carbon atoms. A particularly preferred group of compounds, due to the ready availability of the necessary intermediates for their preparation, are those wherein Z represents C=O and CHR'.

The process aspect of my invention resides in the concept of intramolecularly cyclizing N-amino-4-A-piperidines, where A is a substituent bonded to the piperidine ring through a carbon atom, capable of reacting intramolecularly with the N-amino group resulting in the formation of the 1,2-diazabicyclo[2.2.2]octane ring. Examples of substituents represented by A include carbalkoxy, alkanoyl, α-haloalkyl, cyano, α-hydroxyalkyl, and α-alkane- or arene-sulfonoxyalkyl. The N-amino intermediates for preparing the preferred compounds have the general Formula III,

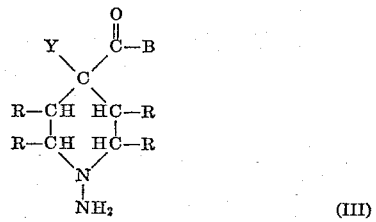

(III)

where Y and R have the meanings defined above, and B is alkoxy, lower-aliphatic, monocarbocyclic-aryl-lower-alkyl, or di(lower-alkyl)amino-lower-alkyl group.

The process of the invention is carried out at temperatures ranging from 0–300° C. Thus, when a compound of the type shown in Formula III is heated to 50 to 300° C., cyclization occurs, resulting in the formation of the products of my invention. Alternatively, the reaction may occur spontaneously (at ambient temperatures) following the preparation of the intermediate of Formula III, as further explained below.

N-Nitroso-4-substituted-piperidines, IV,

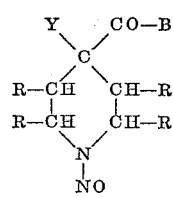

(IV)

where Y, R and B are described above, which are the immediate precursors of the 1-aminopiperidines described above, are prepared from the corresponding 1-unsubstituted-piperidines by the reaction of the latter with nitrous acid at 0–30° C. The nitrous acid is generally prepared in situ from a nitrite (e.g. sodium nitrite and a mineral or other strong acid (e.g. hydrochloric acid). The 1-unsubstituted-piperidines employed as starting materials in conducting the process are generally known or are readily prepared by procedures which will be obvious to those skilled in the art.

Reduction of the N-nitrosopiperidines to the N-aminopiperidines of Formula II can be accomplished by reacting the former with active metal-acid combinations such as zinc and acetic acid or with amalgamated aluminum in moist ether. In many instances, for example, when zinc and acetic acid is the reducing agent, simultaneous cyclization takes place; and, if the cyclization involves the formation of a double bond (azomethine linkage), the double bond is reduced concomitantly. Thus, the reduction of 1-nitroso-4-phenyl-4-propionylpiperidine with zinc and acetic acid yields 3-ethyl-4-phenyl-1,2-diazabicyclo[2.2.2]octane directly. When alkyl 1-nitroso-4-piperidinecarboxylates are reduced with aluminum amalgam in moist ether, the corresponding alkyl 1-amino-4-piperidinecarboxylates can be isolated.

The processes of the invention are more fully illustrated in the following flow charts where in (1), the reacting substituent (A) in the 4-position of the piperidine ring is represented by —COOC₂H₅, and in (2) the reacting substituent is represented by —CO—C₂H₅:

FLOW CHART I

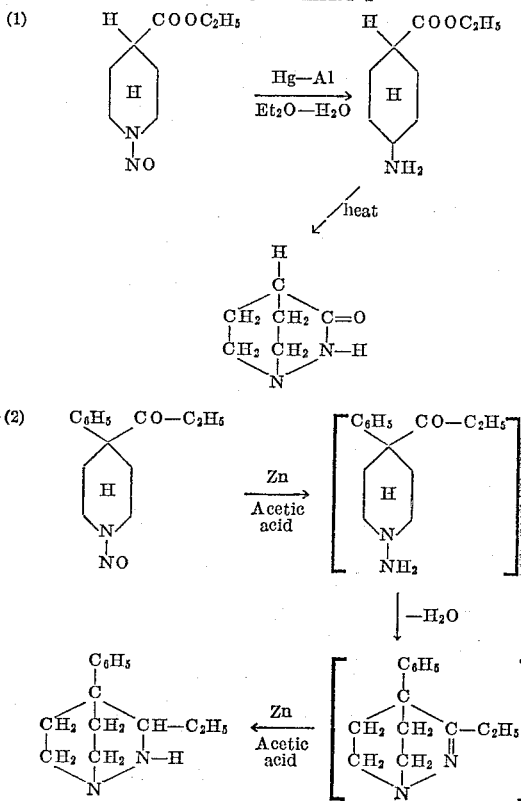

The compounds prepared by the above methods can be used as intermediates for the preparation of a variety of products having the 1,2-diazabicyclo[2.2.2] octane ring system as a constituent part. For example, the secondary nitrogen atoms at the 2-position of the ring has a replaceable H atom and can be acylated, for example, with carboxylic and sulfonic acid halides or with carboxylic acid anhydrides. The secondary nitrogen can also be alkylated with various alkylating agents, for example, alkyl esters of strong acids (alkyl halides, alkyl sulfates, and alkyl arenesulfonates), epoxides, for example, ethyleneoxide, styrene oxide, and the like, reactive vinyl compounds, for example, acrylonitrile, vinyl-pyridine, and the like, and reactive hydroxylated compounds such as glycolonitrile. The secondary amine can enter into various other alkylation reactions such as Mannich alkylation and Eschweiler-Clarke methylation. The acylated compounds can be reduced with suitable reducing agents, for example, lithium aluminum hydride, to give alkylated and aralkylated products. The compounds also react with isocyanates and isothiocyanates to form substituted ureas and thioureas, respectively.

The oxo group in position 3 of the 1,2-diazabicyclo[2.2.2]octane ring is also reactive and is subject to the various reactions characteristic of an amide carbonyl group. For example, it can be reduced to methylene with suitable reducing agents (for example, lithium aluminium hydride), and it can react with phosphorus pentasulfide to form the thiono group.

The compounds of the invention are most conveniently used in the form of water-soluble acid-addition or quaternary ammonium salts; these salts are within the purview of the invention. The acids which can be used to prepare acid-addition salts are those which are pharmacologically acceptable, i.e., those which produce, when combined with the free bases, salts whose anions are relatively innocuous to the animal organism in therapeutic doses of the salts, so that the beneficial physiological properties inherent in the free bases are not vitiated by side-effects ascribable to the anions. Appropriate acid-addition salts are those derived from mineral acids, for example, hydrochloric acid, hydrobromic acid, hydriodic acid and sulfuric acid; and organic acids such as acetic acid, citric acid and tartaric acid. The quaternary ammonium derivatives are obtained by the addition to the free base of an ester of a strong acid, said ester having a molecular weight below about 250. A preferred class of quaternizing agents include lower-alkyl, lower-alkenyl or lower-aralkyl esters of strong inorganic acids or organic sulfonic acids, including such compounds as methyl chloride, methyl bromide, methyl iodide, ethyl bromide, propyl chloride, benzyl chloride, benzyl bromide, methyl sulfate, methyl benzenesulfonate, methyl p-toluenesulfonate and ethyl p-chlorobenzenesulfonate.

All salts, whether toxic or non-toxic, are however, useful as intermediates in the purification of the free bases or in the formation of other salts by ion exchange procedures. They also serve as characterizing derivatives of the free bases.

Pharmacological evaluation of the compounds of the invention have shown that they possess antitussive activity and are useful for the treatment of coughs. Antitussive activity was determined by measuring the extent of inhibition of the cough, produced by mechanical stimulation of the trachea in anesthetized cats, following oral administration of the compound.

The compounds of the invention are prepared preferably for oral administration in the form of tablets, capsules, syrups, or elixers formulated with conventional excipients.

The structure of the compounds of the invention was established by the mode of synthesis, by infrared and nuclear magnetic resonance spectral data, and by the fact that elemental analyses were in agreement with the assigned structures.

The following examples will further illustrate the invention without the latter being limited thereby.

EXAMPLE 1A

*1-nitroso-4-phenyl-4-propionylpiperidine*

To solution containing 20.4 g. (0.08 mole) of 4-phenyl-4-propionylpiperidine hydrochloride and eight drops of concentrated hydrochloric acid in 75 ml. of water was added at room temperature a solution of 6.9 g. (0.1 mole) of sodium nitrite in 75 ml. of water. The oil which originally separated solidified when the mixture was stirred at 40–50° C. for 1 hour. Recrystallized from methanol, the resulting 1-nitroso-4-phenyl-4-propionylpiperidine, consisting of yellow-white crystals, melted at 79–80° C.

Following the above procedure, using the appropriate substituted piperidine in place of 4-phenyl-4-propionylpiperidine, there can be obtained the following 1-nitrosopiperidines:

Ethyl 1-nitroso-2,3,5,6-tetramethyl-4-phenyl-4-piperidinecarboxylate;
1-nitroso-4-(3-butenoyl)-4-phenylpiperidine;
1-nitroso-4-($\beta$-dimethylaminopropionyl)-4-phenylpiperidine;
Ethyl 1-nitroso-4-benzyl-4-piperidinecarboxylate;
Ethyl 1-nitroso-4-(2-thienyl)-4-piperidinecarboxylate;
Ethyl 1-nitroso-4-(2-pyridyl)-4-piperidinecarboxylate;
Ethyl 1-nitroso-4-(1-naphthyl)-4-piperidinecarboxylate;
Ethyl 1-nitroso-4-(3-methoxyphenyl)-4-piperidinecarboxylate;
1-nitroso-4-cyclohexanecarbonyl-4-phenylpiperidine;
1-nitroso-4-phenylacetyl-4-phenylpiperidine;
1-nitroso-4-($\beta$-phenylpropionyl)-4-phenylpiperidine.

EXAMPLE 1B

*3-ethyl-4-phenyl-1,2-diazabicyclo[2.2.2]octane*

A solution containing 14.3 g. (0.058 mole) of 1-nitroso-4-phenyl-4-propionylpiperidine in 25 ml. of glacial acetic acid, 30 ml. of ethanol, and 20 ml. of water was added to a suspension of 19.6 g. (0.3 mole) of 98 percent zinc dust in 60 ml. of ethanol with vigorous stirring at 15–20° C. The mixture was stirred for fifteen minutes at 15° C. and then heated to 70° C. and filtered while hot. The filtrate was concentrated to one-third its original volume and made strongly basic with sodium hydroxide. Extraction of the basic solution and concentration of the extracts yielded an oil consisting of 3-ethyl-4-phenyl-1,2,-diazabicyclo[2.2.2]octane. The hydrochloride salt, recrystallized from ethyl acetate-methanol, melted at 325–327° C.

Pharmacological evaluation of 3-ethyl-4-phenyl-1,2-diazabicyclo [2.2.2]octane hydrochloride has shown that this compound produced 50 percent inhibition of the cough reflex when administered orally to cats at a dose of 6.0 mg./kg.

The following compounds can be prepared according to the foregoing procedure by substituting the appropriate 1-nitrosopiperidine for the 1-nitroso-4-phenyl-4-propionylpiperidine used above:

3-allyl-4-phenyl-1,2-diazabicyclo[2.2.2]octane from 1-nitroso-4(3-butenoyl)-4-phenylpiperidine;

3-($\beta$-dimethylaminoethyl)-4 - phenyl - 1,2-diazabicyclo[2.2.2]octane from -1-nitroso - 4 - ($\beta$-dimethylaminopropionyl)-4-phenylpiperidine;

3-cyclohexyl-4 - phenyl - 1,2-diazabicyclo[2.2.2]octane from 1-nitroso-4-cyclohexylcarbonyl-4-phenylpiperidine;

3-benzyl-4-phenyl-1,2-diazabicyclo[2.22]octane from 1-nitroso-4-phenylacetyl-4-phenylpiperidine; and 3-phenylethyl - 4 - phenyl-1,2-diazabicyclo[2.2.2]octane from 1-nitroso-4-($\beta$-phenylpropionyl)-4-phenylpiperidine.

EXAMPLE 2

*2-acetyl-3-ethyl-4-phenyl-1,2-diazabicyclo[2.2.2]octane*

3-ethyl-4-phenyl - 1,2 - diazabicyclo[2.2.2]octane (0.02 mole) was heated on a steam-bath for four hours with 10 ml. of acetic anhydride. The solution was then poured into water, and the mixture was made basic with sodium hydroxide. The resulting solid, consisting of 2-acetyl-3-ethyl-4-phenyl-1,2-diazabicyclo[2.2.2]octane, melted at 117.2–128.6° C. (corr.) after recrystallization from cyclohexane.

Pharmacological evaluation of 2-acetyl-3-ethyl-4-phenyl-1,2-diazabicyclo[2.2.2]octane has shown that this compound produced 14.2 percent inhibition of the cough reflex in cats when administered orally in doses of 25 mg./kg.

The following compounds can also be prepared by treating 3 - ethyl-4-phenyl-1,2-diazabicyclo[2.2.2]octane with the designated acylating agent:

2 - benzoyl - 3 - ethyl-4-phenyl-1,2-diazabicyclo[2.2.2]octane with benzoyl chloride;

2 - methanesulfonyl-3-ethyl-4-phenyl 1,2-diazabicyclo[2.2.2]octane with methanesulfonyl chloride;

2 - benzenesulfonyl - 3 - ethyl-4-phenyl-1,2-diazabicyclo[2.2.2]octane with benzenesulfonyl chloride;

2-(β-carboxyacryloyl)-3-ethyl - 4-phenyl-1,2-diazabicyclo[2.2.2]octane with maleic anhydride;

2-isonicotinoyl-3-ethyl - 4 - phenyl - 1,2 - diazabicyclo[2.2.2]octane with isonicotinoyl chloride hydrochloride; and 2-dichloroacetyl - 3 - ethyl - 4-phenyl-1,2-diazabicyclo[2.2.2]octane with dichloroacetyl chloride.

EXAMPLE 3

*3-oxo-4-phenyl-1,2-diazabicyclo[2.2.2]octane*

Ethyl 1-amino-4-phenylpiperidine-4-carboxylate (78.0 g.; 0.314 mole, prepared by reduction of ethyl 1-nitroso-4-phenylpiperidine-4-carboxylate according to the procedure given in Example 1B) was heated in a flask under an air condenser at 120–210° C. for 1.5 hours, and the resulting oil was allowed to stand overnight. Trituration of the oil with cyclohexane gave a white solid consisting of 3-oxo-4 - phenyl - 1,2 - diazabicyclo[2.2.2]octane, which, after recrystallization from acetic acid-ethanol, melted at 248.0–249.2° C. (corr.). The p-toluenesulfonic acid salt melted at 217.8–219.4° C. (corr.).

3-oxo-4-phenyl-1,2 - diazabicyclo[2.2.2]octane methochloride, prepared from the above compound by reacting it with methyl iodide followed by ion-exchange on a chloride ion-exchange resin, melted with decomposition at 221.8–222.6° C. (corr.) after recrystallization from ethanol.

Pharmacological evaluation of 3-oxo-4-phenyl-1,2-diazabicyclo[2.2.2]octane has shown that this compound produced 17.6 percent inhibition of the cough reflex in cats when administered orally in doses of 25 mg./kg.

The following compounds can also be prepared by heating the appropriate ethyl 1-aminopiperidine-4-carboxylate prepared by reduction of the corresponding 1-nitrosopiperidine:

4-phenyl - 5,6,7,8 - tetramethyl - 3 - oxo - 1,2-diazabicyclo[2.2.2]octane;
4-benzyl-3-oxo-1,2-diazabicyclo[2.2.2]octane;
4-(2-thienyl)-3-oxo,1,2-diazabicyclo[2.2.2]octane;
4-(2-pyridyl)-3-oxo-1,2-diazabicyclo[2.2.2]octane;
4-(1-naphthyl)-3-oxo-1,2-diazabicyclo[2.2.2]octane; and
4-(3-methoxyphenyl)-3-oxo - 1,2 - diazabicyclo[2.2.2]octane.

EXAMPLE 4

*4-phenyl-1,2-diazabicyclo[2.2.2]octane*

To a suspension of 4.0 g. (0.1 mole) of lithium aluminum hydride in 100 ml. of tetrahydrofuran was added 9.0 g. (0.045 mole) of 4-phenyl-3-oxo-1,2-diazabicyclo[2.2.2]octane. The mixture was refluxed 7 hours with stirring and allowed to stand overnight. The complex was decomposed with water and sodium hydroxide, filtered, and the filtrate concentrated to an oil. The oil, consisting of crude 4-phenyl-1,2,diazabicyclo[2.2.2]octane, yielded crystals from n-hexane which melted at 97–99° C. The hydrochloride salt was prepared in ether and was recrystallized from ethanol-ether. The resulting pure 4-phenyl-1,2-diazabicyclo[2.2.2]octane hydrochloride melted at 208.2–208.8° C. (corr.).

Pharmacological evaluation has shown that 4-phenyl-1,2-diazabicyclo[2.2.2]octane hydrochloride produced 50 percent inhibition of the cough reflex in cats when administered orally in doses of 16.5 mg./kg. The compound was also found to be more effective when reserpine in reducing hypertension in renal hypertensive rats.

The following compound can be prepared by reducing the corresponding 3-oxo compounds according to the above procedure:

4-phenyl-5,6,7,8-tetramethyl - 1,2 - diazabicyclo[2.2.2]octane;
4-benzyl-1,2-diazabicyclo[2.2.2]octane;
4-(2-thienyl)-1,2-diazabicyclo[2.2.2]octane;
4-(2-pyridyl)-1,2-diazabicyclo[2.2.2]octane;
4-(1-naphthyl)-1,2-diazabicyclo[2.2.2]octane; and
4-(3-methoxyphenyl)-1,2-diazabicyclo[2.2.2]octane.

EXAMPLE 5

*2-formyl-4-phenyl-1,2-diazabicyclo[2.2.2]octane*

To a solution containing 3.4 g. (0.018 mole) of 4-phenyl-1,2-diazabicyclo[2.2.2]octane in 5 ml. of chloroform was added 2.66 g. (0.018 mole) of chloral. The solution became warm spontaneously, and the product crystallized. Recrystallized from cyclohexane, the 2-formyl-4-phenyl-1,2-diazabicyclo[2.2.2]octane thus prepared, melted at 104.4–105.6° C. (corr.).

EXAMPLE 6

*2-methyl-4-phenyl-1,2-diazabicyclo[2.2.2]octane*

Following the procedure given in Example 4, 4.0 g. (0.186 mole) of 2-formyl-4-phenyl-1,2-diazabicyclo[2.2.2]octane was reduced with 1.52 g. (0.04 mole) of lithium aluminum hydride. Recrystallized from isopropanol, the resulting 2-methyl-4-phenyl-1,2-diazabicyclo[2.2.2]octane hydrochloride melted at 196.4–198.6° C. (corr.).

Pharmacological evaluation has shown that 2-methyl-4 - phenyl - 1,2 - diazabicyclo[2.2.2]octane hydrochloride produced 50 percent inhibition of the cough reflex in cats when administered oral doses of 37.0 mg./kg.

Other 2-alkyl and 2-aralkyl-substituted 1,2-diazabicyclo[2.2.2]octanes can be prepared by reduction of the corresponding 2-acyl compounds as above, for example:

2-benzyl-3-ethyl-4-phenyl-1,2-diazabicyclo[2.2.2]octane from 2-benzoyl-3-ethyl-4-phenyl-1,2-diazabicyclo[2.2.2]octane;

2,3-diethyl - 4 - phenyl - 1,2 - diazabicyclo[2.2.2]octane by reducing 2-acetyl-3-ethyl-4 - phenyl - 1,2 - diazabicyclo[2.2.2]octane;

2-[1-(4-hydroxy-2-butenyl)] - 3 - ethyl - 4 - phenyl-1,2-diazabicyclo[2.2.2]octane by reducing 2 - (β - carboxyacryloyl)-3-ethyl-4-phenyl-1,2 - diazabicyclo[2.2.2]octane; and 2-(4-picolinyl)-3 - ethyl - 4 - phenyl - 1,2 - diazabicyclo[2.2.2]octane by reducing 2 - isonicotinoyl - 3 - ethyl-4-phenyl-1,2-diazabicyclo[2.2.2]octane.

EXAMPLE 7

*4-phenyl-2-phenylcarbamyl-1,2-diazabicyclo[2.2.2]octane*

When to a solution containing 3.6 g. (0.02 mole) of 4-phenyl-1,2-diazabicyclo[2.2.2]octane in 30 ml. of benzene was added 2.5 g. (0.021 mole) of phenyl isocyanate; a solid product precipitated. Recrystallized from toluene, the 4 - phenyl-2-phenylcarbamyl-1,2-diazabicyclo[2.2.2]-octane thus prepared melted at 196.4–198.2° C. (corr.).

Pharmacological evaluation has shown that 4-phenyl-2-phenyl-carbamyl-1,2-diazabicyclo[2.2.2]octane produced 12.5 percent inhibition of the cough reflex in cats when administered orally in doses of 25 mg./kg.

The following compounds can be prepared according to the above procedure by substituting for phenyl isocyanate the designated cyanate or isocyanate:

4 - phenyl - 2 - carbamyl-1,2-diazabicyclo[2.2.2]octane with potassium cyanate;

4 - phenyl-2-(4-nitrophenylcarbamyl)-1,2-diazabicyclo-[2.2.2]octane with 4-nitrophenyl isocyanate;

4-phenyl - 2 - butylcarbamyl-1,2-diazabicyclo[2.2.2]octane with n-butyl isocyanate; and 4 - phenyl - 2 - carbethoxymethylcarbamyl-1,2-diazabicyclo[2.2.2]octane with carbethoxymethyl isocyanate.

EXAMPLE 8

*2-acetyl-4-phenyl-1,2-diazabicyclo[2.2.2]octane*

Following the procedure given in Example 2, 2-acetyl-4 - phenyl - 1,2 - diazabicyclo[2.2.2]octane was prepared from 4-phenyl-1,2-diazabicyclo[2.2.2]octane and acetic anhydride. Following recrystallization from cyclohexane, the product melted at 89.0–91.0° C. (corr.).

Pharmacological evaluation of 2-acetyl-4-phenyl-1,2-diazabicyclo[2.2.2]octane has shown that it inhibited 30 percent of the cough reflex in cats when administered orally in doses of 25 mg./kg.

Following the same procedure, there can also be prepared from 4-phenyl-1,2-diazabicyclo[2.2.2]octane and the designated acyl halide the following compounds:

2 - (chloroacetyl)-4-phenyl-1,2-diazabicyclo[2.2.2]octane, with chloroacetyl chloride;

2 - (3 - chloropropionyl) - 4 - phenyl-1,2-diazabicyclo-[2.2.2]octane, with 3-chloropropionyl chloride; and 2-trifluoroacetyl - 4 - phenyl-1,2-diazabicyclo[2.2.2]octane, with trifluoroacetyl chloride.

EXAMPLE 9

*2-cyanomethyl-4-phenyl-1,2-diazabicyclo[2.2.2]octane*

A mixture of 4.7 g. (0.025 mole) of 4-phenyl-1,2-diazabicyclo[2.2.2]octane and 4.07 g. (0.05 mole) of 70 percent glycolonitrile was heated briefly to boiling, allowed to stand for 2 hours and poured into water. The resulting solid was recrystallized from aqueous ethanol and from cyclohexane. The pure 2-cyanomethyl-4-phenyl-1,2-diazabicyclo[2.2.2]octane thus prepared melted at 72.2–74.0° C. (corr.).

Pharmacological evaluation has shown that 2-cyanomethyl-4-phenyl-1,2-diazabicyclo[2.2.2]octane produced 50 percent inhibition of the cough reflex in cats when administered orally in doses of 63 mg./kg.

The following compounds can also be prepared according to the above procedure by treating 4-phenyl-1,2-diazabicyclo [2.2.2]octane with the designated reactants:

2 - (2-cyanoethyl)-4-phenyl-1,2-diazabicyclo[2.2.2]octane, with acrylonitrile;

2-(2-hydroxyethyl)-4-phenyl-1,2-diazabicyclo[2.2.2]octane with ethylene oxide; and 2 - (2 - pyridylethyl)-4-phenyl-1,2-diazabicyclo[2.2.2]-octane, with 2-vinylpyridine.

EXAMPLE 10A

*Methyl 1-aminopiperidine-4-carboxylate*

Methyl 1-nitrosopiperidine-4-carboxylate (51.7 g.; 0.3 mole), which was prepared from methyl isonipecotate according to the procedure given in Example 1A, was added slowly to a stirred suspension of aluminum amalgam in moist ether. Violent refluxing was controlled by cooling the reaction mixture in ice. When the original reaction had subsided, 16 ml. of water was added dropwise, and the mixture was stirred for fifteen minutes. The ether layer was concentrated to a yellow-oil consisting of methyl 1-aminopiperdine-4-carboxylate, $n_D^{27}$ 1.4782.

EXAMPLE 10B

*3-oxo-1,2-diazabicyclo[2.2.2]octane*

Methyl 1-aminopiperidine-4-carboxylate (31.6 g.; 0.2 mole), was heated to 190–195° C. in 200 ml. of a biphenyl-diphenyl ether eutectic mixture (Dowtherm A) under nitrogen for 3 hours. The cooled mixture was poured into 1.5 l. of n-pentane. The resulting tan semi-solid was crystallized from acetonitrile and recrystallized from propionitrile. The 3-oxo-1,2-diazabicyclo[2.2.2]octane thus prepared melted at 170.8–173.4° C. (corr.).

Pharmacological evaluation has shown that 3-oxo-1,2-diazabicyclo[2.2.2]octane inhibited 37 percent of the cough reflex in cats when administered orally in doses of 40 mg./kg.

EXAMPLE 11

*1,2-diazabicyclo[2.2.2]octane*

Following the procedure given in Example 4, 12.6 g. (0.1 mole) of 3-oxo-1,2-diazabicyclo[2.2.2]octane was reduced in tetrahydrofuran with 7.6 g. (0.2 mole) of lithium aluminum hydride. The hydrochloride salt was prepared in ethanol-ether. Recrystallized from isopropanol-ethyl acetate, the pure 1,2-diazabicyclo[2.2.2]-octane hydrochloride thus prepared melted with decomposition at 264.0–265.8° C. (corr.).

Pharmacological evaluation of 1,2-diazabicyclo[2.2.2]-octane hydrochloride has shown that it inhibited 42.5 percent of the cough reflex in cats when administered orally in doses of 40 mg./kg.

EXAMPLE 12

*2-phenylthiocarbamyl-1,2-diazabicyclo[2.2.2]octane*

To a solution containing 3.36 g. (0.03 mole) of 1,2-diazabicyclo[2.2.2]octane in 20 ml. of benzene was added 4.05 g. (0.03 mole) of phenyl isothiocyanate. The solution, which became warm spontaneously, was allowed to stand for 3 hours, filtered, and concentrated under reduced pressure to give a while solid. Recrystallized from ethanol, the 2 - phenyl-thiocarbamyl - 1,2-diazabicyclo-[2.2.2]octane thus prepared melted at 125.5–127.2° C. (corr.).

Pharmacological evaluation of 2-phenylthiocarbamyl-1,2-diazabicyclo[2.2.2]octane has shown that it inhibited 15 percent of the cough reflex in cats when administered orally in doses of 40 mg./kg.

The following compounds can be prepared according to the above procedure by substituting for phenyl isothiocyanate the designated isothiocyanate:

2 - n - butylthiocarbamyl - 1,2-diazabicyclo[2.2.2]octane with n-butyl isothiocyanate;

2 - allylthiocarbamyl - 1,2 - diazabicyclo[2.2.2]octane with allyl isothiocyanate; and 2 - thiocarbamyl - 1,2 - diazabicyclo[2.2.2]octane with potassium thiocyanate.

EXAMPLE 13A

*4-butyrylpiperidine*

4-cyanopiperidine (0.2 mole) was treated with 0.7 mole of n-propyllithium in ether. Following hydrolysis of the lithium complex, the ether solution was extracted with dilute hydrochloric acid, and the acid extract was refluxed for 5 hours. The solution was then made basic with sodium hydroxide and extracted with ether. Concentration of the ether extract yielded an oil consisting of 4-butyrylpiperidine which boiled at 60–65° C. at 0.15 mm., $n_D^{28}$ 1.4681. The hydrochloride salt melted at 127–128.5° C.

EXAMPLE 13B

*3-propyl-1,2-diazabicyclo[2.2.2]octane*

Following the procedure given in Example 1A, 1-nitroso-4-butyrylpiperidine was prepared from 15.4 g. (0.081 mole) of 4-butyryl-piperidine hydrochloride and 0.1 mole of nitrous acid.

Following the procedure given in Example 1B the above 1-nitroso-4-butyrylpiperidine was reacted with zinc dust and acetic acid, to give 3-propyl-1,2-diazabicyclo-[2.2.2]octane. The hydrochloride salt was prepared in ether. Recrystallized from ethanol-ether and from acetone, the resulting 3-propyl-1,2-diazabicyclo[2.2.2]octane hydrochloride melted at 223.0–224.8° C. (corr.).

3-propyl-1,2-diazabicyclo[2.2.2]octane can also be prepared by reducing 1-nitroso-4-butyrylpiperidine with aluminum amalgam in moist ether according to the procedure given in Example 10A.

EXAMPLE 14A

*4-acetyl-1-nitroso-4-phenylpiperidine*

Following the procedure given in Example 1A 4-acetyl-4-phenylpiperidine was treated with a slight excess of nitrous acid to give 4-acetyl-1-nitroso-4-phenylpiperidine, which melted at 58–60° C.

EXAMPLE 14B

*3-methyl-4-phenyl-1,2-diazabicyclo[2.2.2]octane*

Following the procedure given in Example 1B 4-acetyl-4-phenyl-1-nitroso-piperidine (37.7 g.; 0.163 mole) was reduced with zinc dust and acetic acid to give 3-methyl-4-phenyl-1,2-diazabicyclo[2.2.2]octane hydrochloride as a yellow oil. The hydrochloride salt, prepared in ether and recrystallized from ethanol melted with decomposition at 330–332° C.

Pharmacological evaluation of 3-methyl-4-phenyl-1,2-diazabicyclo[2.2.2]octane hydrochloride has shown that it inhibited 31 percent of the cough reflex in cats when administered orally in doses of 40 mg./kg.

EXAMPLE 15A

*4-octanoyl-4-phenylpiperidine*

A solution containing 138.2 g. (0.5 mole) of 1-benzyl-4-cyano-4-phenylpiperidine in 700 ml. of dry toluene was added to a solution containing 1.5 moles of n-heptylmagnesium bromide in 700 ml. of absolute ether. The ether was distilled from the reaction mixture, and the remaining solution was refluxed for two hours. The complex was then hydrolyzed with 2 kg. of ice and 500 ml. of concentrated hydrochloric acid and the aqueous phase was refluxed for six hours. The solution was made basic with sodium hydroxide and extracted with ether. The oil remaining after distillation of the ether was crystallized from n-pentane. The 1-benzyl-octanoyl-4-phenylpiperidine thus prepared melted at 71.5–72.5° C.

The 1-benzyl-4-octanoyl-4-phenylpiperidine prepared above was hydrogenated over 10 percent palladium-on-charcoal in acetic acid-ethanol for four hours at 45° C. The catalyst was removed by filtration, and the filtrate was concentrated to an oil which consisted of crude 4-octanoyl-4-phenylpiperidine. The hydrochloride salt, prepared in ether-ethanol, melted at 123.5–125° C.

EXAMPLE 15B

*1-nitroso-4-octanoyl-4-phenylpiperidine*

Following the procedure given in Example 1A, 63.8 g. (0.196 mole) of 4-octanoyl-4-phenylpiperidine hydrochloride was treated with a slight excess of nitrous acid to give 1-nitroso-4-octanoyl-4-phenylpiperidine.

EXAMPLE 15C

*3-heptyl-1-phenyl-1,2-diazabicyclo[2.2.2]octane*

Following the procedure given in Example 1B, 1-nitroso-4-octanoyl-4-phenylpiperidine was treated with an excess of zinc dust and acetic acid to give 3-heptyl-4-phenyl-1,2-diazabicyclo[2.2.2]octane as an orange oil. The hydrochloride salt was prepared in ethanol and was recrystallized from methyl ethyl ketone. Pure 3-heptyl-4-phenyl - 1,2-diazabicyclo[2.2.2]octane hydrochloride thus prepared, melted at 222.2–224.0° C. (corr.).

Pharmacological evaluation has shown that 3-heptyl-4-phenyl-1,2-diazabicyclo[2.2.2]octane inhibited 50 percent of the cough reflex in cats when administered orally in doses of 19 mg./kg.

Chemotherapeutic evaluation of this compound has shown that it was bacteriostatic and bactericidal against *S. aureus* at a concentration of 0.05 mg./cc. and against *E. typhi* at 0.075 mg./kg.

EXAMPLE 16A

*4-valeryl-1-nitroso-4-phenylpiperidine*

Following the procedure given in Example 1A, 19.0 g. (0.067 mole) of 4-valeryl-4-phenylpiperidine hydrochloride (prepared according to the procedure given in Example 15A from 1-benzyl-4-cyano-4-phenylpiperidine and n-butyllithium [M.P. 109–112° C.]) was treated with an excess of nitrous acid to give 4-valeryl-1-nitroso-4-phenylpiperidine as an orange oil.

EXAMPLE 16B

*3-butyl-4-phenyl-1,2-diazabicyclo[2.2.2]octane*

Following the procedure given in Example 1B, 4-valeryl-4-phenyl-1-nitroso-piperidine was reduced with an excess of zinc dust and acetic acid to give 3-butyl-4-phenyl-1,2-diazabicyclo[2.2.2]octane as an oil. The hydrochloride salt was prepared in ether and recrystallized from isopropyl alcohol-ether and from propionitrile. The pure 3-butyl-4-phenyl-1,2-diazabicyclo[2.2.2]octane hydrochloride thus prepared, melted at 218.0–219.2° C. (corr.).

Pharmacological evaluation has shown that 3-butyl-4-phenyl-1,2-diazabicyclo[2.2.2]octane hydrochloride inhibited 45 percent of the cough reflex in cats when administered orally in doses of 25 mg./kg.

EXAMPLE 17A

*4-butyryl-1-nitroso-4-phenylpiperidine*

Following procedure given in Example 1A 4-butyryl-4-phenylpiperidine hydrochloride was treated with a slight excess of nitrous acid to give 4-butyryl-1-nitroso-4-phenylpiperidine, which melted at 94–95.5° C.

EXAMPLE 17B

*4-phenyl-3-propyl-1,2-diazabicyclo[2.2.2]octane*

Following the procedure given in Example 1B, 4-phenyl-4-butyryl-1-nitroso-piperidine was reduced with an excess of zinc dust and acetic acid to give 4-phenyl-4-propyl-1,2-diazabicyclo[2.2.2]octane as a yellow oil. The hydrochloride salt was prepared in ether and recrystallized from ethanol. A pure 4-phenyl-3-propyl - 1,2-diazabicyclo [2.2.2]octane hydrochloride thus prepared, melted at 245.0–247.0° C. (corr.).

Pharmacological evaluation has shown that 4-phenyl-3-propyl-1,2-diazabicyclo[2.2.2]octane hydrochloride produced inhibition of 50 percent of the cough reflex in cats when administered orally dose of 11 mg./kg. This response was equivalent to that produced by the administration of 9.3 mg./kg. of codeine.

4-phenyl - 3 - propyl-1,2-diazobicyclo[2.2.2]octane obtained as above can be reacted with various acids in addition to hydrochloric acid, for example, hydrobromic acid, hydriodic acid, sulfuric acid, sulfam acid, citric acid, ethanesulfonic acid, benzene sulfonic acid, or quinic acid to give, respectively, the hydrobromide, hydriodide, sulfate, sulfonate, citrate, ethanesulfonate, benzenesulfonate or quinate salt of 4-phenyl-3-propyl-1,2-diazabicyclo-[2.2.2]octane. Any other acid-addition salts can be prepared similarly using the desired acid. The free base can also be reacted with various esters as described above, e.g., methyl sulfate, allyl chloride, or benzyl bromide, to give, respectively, the methosulfate, allochloride, or benzobromide of 4-phenyl-3-propyl-1,2-diazabicyclo[2.2.2]-octane.

EXAMPLE 18

*3-imino-4-phenyl-1,2-diazabicyclo[2.2.2]octane benzenesulfonate*

Following the procedures given in Example 1A, 4-phenyl-4-cyanopiperidine is treated with an excess of nitrous acid to give 1-nitroso-4-cyano-4-phenylpiperidine, which is reduced according to the procedure given in Example 1B to give 1-amino-4-cyano-4-phenylpiperidine. The benzenesulfonate salt is prepared therefrom by reaction with benzenesulfonic acid. 3-imino-4-phenyl-1,2-diazabicyclo[2.2.2]octane benzenesulfonate is prepared from 1-amino-4-cyano-4-phenylpiperidine benzenesulfonate by heating it to 200–300° C. according to the procedure given in Example 3.

EXAMPLE 19

*4-phenyl-3-thiono-1,2-diazabicyclo[2.2.2]octane*

4-phenyl-3-thiono-1,2-diazabicyclo[2.2.2]octane is prepared by treating 3-oxo-4-phenyl-1,2-diazabicyclo[2.2.2]octane (Example 3) with one molecular equivalent of phosphorus pentasulfide in refluxing xylene.

EXAMPLE 20

*2-(2-diethylaminoethyl)-4-phenyl-1,2-diazabicyclo-[2.2.2]octane*

2-dimethylaminoacetyl-4-phenyl-1,2-diazabicyclo[2.2.2]-octane is prepared by treating 2-chloroacetyl-4-phenyl-1,2-diazabicyclo[2.2.2]octane (Example 8) with diethylamine in ethanol. Reduction of this product with lithium aluminum hydride according to the procedure given in Example 4 yields 2-(2-diethylaminoethyl)-4-phenyl-1,2-diazabicyclo[2.2.2]octane.

2-(3-dimethylaminopropyl)-4-phenyl-1,2-diazabicyclo-[2.2.2]octane can similarly be prepared by reducing 2-(3-dimethylaminopropionyl)-4-phenyl-1,2-diazabicyclo[2.2.2]octane, which, in turn, is prepared from 2-(3-chloropropionyl)-4-phenyl-1,2-diazabicyclo[2.2.2]octane (Example 8) and dimethylamine.

2-(2-aminoethyl)-4-phenyl-1,2-diazabicyclo[2.2.2]-octane can be prepared by reducing 2-cyanomethyl-4-phenyl-1,2-diazabicyclo[2.2.2]octane (Example 9) with lithium aluminium hydride.

2-(3-aminopropyl)-4-phenyl-1,2-diazabicyclo[2.2.2]-octane can be prepared by reducing 2-(2-cyanoethyl-4-phenyl-1,2-diazabicyclo[2.2.2]octane (Example 9) with lithium aluminium hydride.

I claim:
Methyl 1-aminopiperidine-4-carboxylate.

References Cited by the Examiner

UNITED STATES PATENTS

| 3,024,235 | 3/62 | Mager et al. | 260—250 |
| 3,024,301 | 3/62 | Frearson et al. | 260—294.3 |
| 3,029,244 | 4/62 | Lyle et al. | 260—294.3 |
| 3,037,022 | 5/62 | Lowrie | 260—250 |

OTHER REFERENCES

Schaumann: Arch. Exptl. Path. and Pharm., vol. 196 (1940) at p. 127, complete article at pages 109–36.

Schaumann: Chemical Abstracts, vol. 35 (1941), columns 2976–7 (abstract of Arch. Exptl. Path. Pharmakol, vol. 196 (1940), pages 109–36).

NICHOLAS S. RIZZO, *Primary Examiner.*

DUVAL T. McCUTCHEN, *Examiner.*

UNITED STATES PATENT OFFICE
CERTIFICATE OF CORRECTION

Patent No. 3,198,801            August 3, 1965

Philip M. Carabateas

It is hereby certified that error appears in the above numbered patent requiring correction and that the said Letters Patent should read as corrected below.

Column 3, line 1, strike out "thiazolyl, quinolinyl, indolyl, oxazolyl, thiazinyl, thienyl," and insert the same after "furyl," in line 4, same column 3; column 4, line 15, after "nitrite" insert a closing parenthesis; same column 4, lines 44 to 50, the right-hand formula should appear as shown below instead of as in the patent:

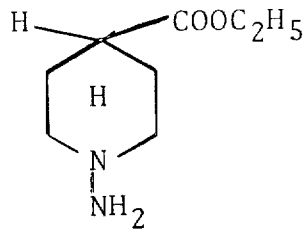

column 6, line 7, after "To" insert -- a --; line 13, for "40-50° C." read -- 40-45° C. --; line 71, for "[2.22]" read -- [2.2.2] --; column 7, line 22, for "-4-phenyl 1,2-" read -- -4-phenyl-1,2- --; column 8, line 14, for "when" read -- than --; column 10, line 2, for "-aminopiperdine-" read -- -aminopiperidine- --; line 42, for "while" read -- white --; column 11, line 49, for "1-benzyl-octanoyl-" read -- 1-benzyl-4-octanoyl- --; line 68, for "-1-phenyl-", in italics, read -- -4-phenyl- --, in italics; column 12, line 60, for "dose" read -- doses --; line 63, for "-diazobicyclo" read -- -diazabicyclo --.

Signed and sealed this 5th day of July 1966.

(SEAL)
Attest:

ERNEST W. SWIDER            EDWARD J. BRENNER
Attesting Officer            Commissioner of Patents